United States Patent
Allarey et al.

(10) Patent No.: US 8,356,197 B2
(45) Date of Patent: *Jan. 15, 2013

(54) METHOD, APPARATUS, AND SYSTEM FOR OPTIMIZING FREQUENCY AND PERFORMANCE IN A MULTIDIE MICROPROCESSOR

(75) Inventors: Jose P Allarey, Davis, CA (US);
Varghese George, Folsom, CA (US);
Sanjeev Jahagirdar, Folsom, CA (US);
Oren Lamdan, Kiryat Tivon (IL);
Nathan J Ofer, Kiryat Tivon (IL);
Tomer Ziv, Rishon Lezion (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/156,267

(22) Filed: Jun. 8, 2011

(65) Prior Publication Data
US 2011/0238973 A1 Sep. 29, 2011

Related U.S. Application Data

(63) Continuation of application No. 11/940,958, filed on Nov. 15, 2007, now Pat. No. 8,032,772.

(51) Int. Cl.
*G06F 1/00* (2006.01)
*G06F 1/32* (2006.01)

(52) U.S. Cl. .................. 713/322; 713/320; 713/300

(58) Field of Classification Search .............. 713/322
See application file for complete search history.

(56) References Cited

U.S. PATENT DOCUMENTS

| 6,556,160 | B1 | 4/2003 | Kamel et al. |
|---|---|---|---|
| 6,631,474 | B1 * | 10/2003 | Cai et al. ............. 713/300 |
| 6,804,632 | B2 | 10/2004 | Orenstien et al. |
| 7,093,147 | B2 * | 8/2006 | Farkas et al. ......... 713/320 |
| 7,249,268 | B2 | 7/2007 | Bhandarkar |

(Continued)

FOREIGN PATENT DOCUMENTS

JP 09-026900 1/1997

(Continued)

OTHER PUBLICATIONS

Notice of Reasons for Rejection for Japanese Patent Application No. 2008-290587, Mailed Oct. 12, 2010, 3 pages.

(Continued)

Primary Examiner — Suresh Suryawanshi
(74) Attorney, Agent, or Firm — Trop, Pruner & Hu, P.C.

(57) ABSTRACT

With the progress toward multi-core processors, each core is can not readily ascertain the status of the other dies with respect to an idle or active status. A proposal for utilizing an interface to transmit core status among multiple cores in a multi-die microprocessor is discussed. Consequently, this facilitates thermal management by allowing an optimal setting for setting performance and frequency based on utilizing each core status.

20 Claims, 7 Drawing Sheets

U.S. PATENT DOCUMENTS

| | | | |
|---|---|---|---|
| 7,490,254 B2 * | 2/2009 | Clark | 713/320 |
| 7,502,948 B2 | 3/2009 | Rotem et al. | |
| 7,650,518 B2 | 1/2010 | Allarey et al. | |
| 8,032,772 B2 * | 10/2011 | Allarey et al. | 713/322 |
| 2002/0133729 A1 | 9/2002 | Therien et al. | |
| 2002/0194509 A1 | 12/2002 | Plante et al. | |
| 2004/0071184 A1 | 4/2004 | Naveh et al. | |
| 2005/0289365 A1 | 12/2005 | Bhandarkar | |
| 2006/0026447 A1 | 2/2006 | Naveh et al. | |
| 2006/0053326 A1 | 3/2006 | Naveh et al. | |
| 2006/0149975 A1 | 7/2006 | Rotem et al. | |
| 2007/0033425 A1 | 2/2007 | Clark | |

FOREIGN PATENT DOCUMENTS

| | | |
|---|---|---|
| JP | 2001202155 | 7/2001 |
| JP | 2007102673 | 4/2007 |

OTHER PUBLICATIONS

First Office Action for Chinese Patent Application No. 200810182271.8, Mailed Jul. 5, 2010, 5 pages.

* cited by examiner

METHOD, APPARATUS, AND SYSTEM FOR OPTIMIZING FREQUENCY AND PERFORMANCE IN A MULTIDIE MICROPROCESSOR

PRIORITY

This is a continuation of application Ser. No. 11/940,958, filed on Nov. 15, 2007, now U.S. Pat. No. 8,032,772, entitled "Method, Apparatus, and System For Optimizing Frequency And Performance In a Multi-Die Microprocessor," and assigned to the corporate assignee of the present invention and incorporated herein by reference.

BACKGROUND

Embodiments of the present invention relate to thermal management of microprocessors and more specifically to optimize frequency and performance in a multi-die microprocessor via a serial link replicating states across the multiple dies.

In a multi-core microprocessor, it may be desirable to allow the cores to use available power headroom to maximize performance. In such instances, the cores may operate at frequencies and/or voltages above those specified by the manufacturer. Thermal throttling may then be used to reduce the operating frequency and/or voltage of the cores when a target temperature is reached or exceeded.

However, thermal throttling may not occur in some environments, such as where the ambient temperature is sufficiently low. In such an environment, there is no mechanism available to reduce the operating frequency and/or voltage, and the processor will be permitted to run at a frequency/voltage greater than specified by the manufacturer for an indefinite amount of time. In this case, the power delivery system must be over-designed in order to supply the additional power required for the system.

With the progress toward multi-die processors, each die can not readily ascertain the status of the other dies with respect to an idle or active status. Consequently, this precludes setting an optimal frequency and performance for the multi-die processor. One inefficient solution is routing dedicated signal lines to transmit and receive core power status. Unfortunately, the cost of this solution is directly proportional to the number of cores as well as the number of core power states.

BRIEF DESCRIPTION OF THE DRAWINGS

A better understanding of the present invention can be obtained from the following detailed description in conjunction with the following drawings, in which.

DETAILED DESCRIPTION

In the following description, for purposes of explanation, numerous details are set forth in order to provide a thorough understanding of embodiments of the present invention. However, it will be apparent to one skilled in the art that these specific details are not required in order to practice the present invention as hereinafter claimed.

Embodiments of the present invention concern the use of a dedicated interface to transmit core status among multiple cores in a multi-die microprocessor. Although the following discussion centers on dual core and quad core processor implementations, it will be understood by those skilled in the art that the present invention as hereinafter claimed may be practiced in support of a multi-core processor having a different number of cores as well and any integrated chip, such as, a microcontroller, application specific integrated chip (ASIC), etc. that has multiple processing elements or logic elements.

The present application is related to and may incorporate embodiments from a previously filed application. The application, is titled "A Method, Apparatus, and System for Increasing Single Core Performance in a Multi-core Microprocessor", application Ser. No. 11/477,751 (U.S. Pat. No. 7,650,518).

As used herein, "single core turbo mode" is an operational mode of a multi-core microprocessor. When a multi-core microprocessor is in single core turbo mode, the multi-core processor may operate at a higher operating point, and thus, at least one core may run at a higher operational frequency and/or voltage only as long as at least one core remains idle. Thus, in single core turbo mode, the power and thermal headroom of one or more idle cores may be used to increase the operational frequency of one or more cores that are not idle.

Figure 1:
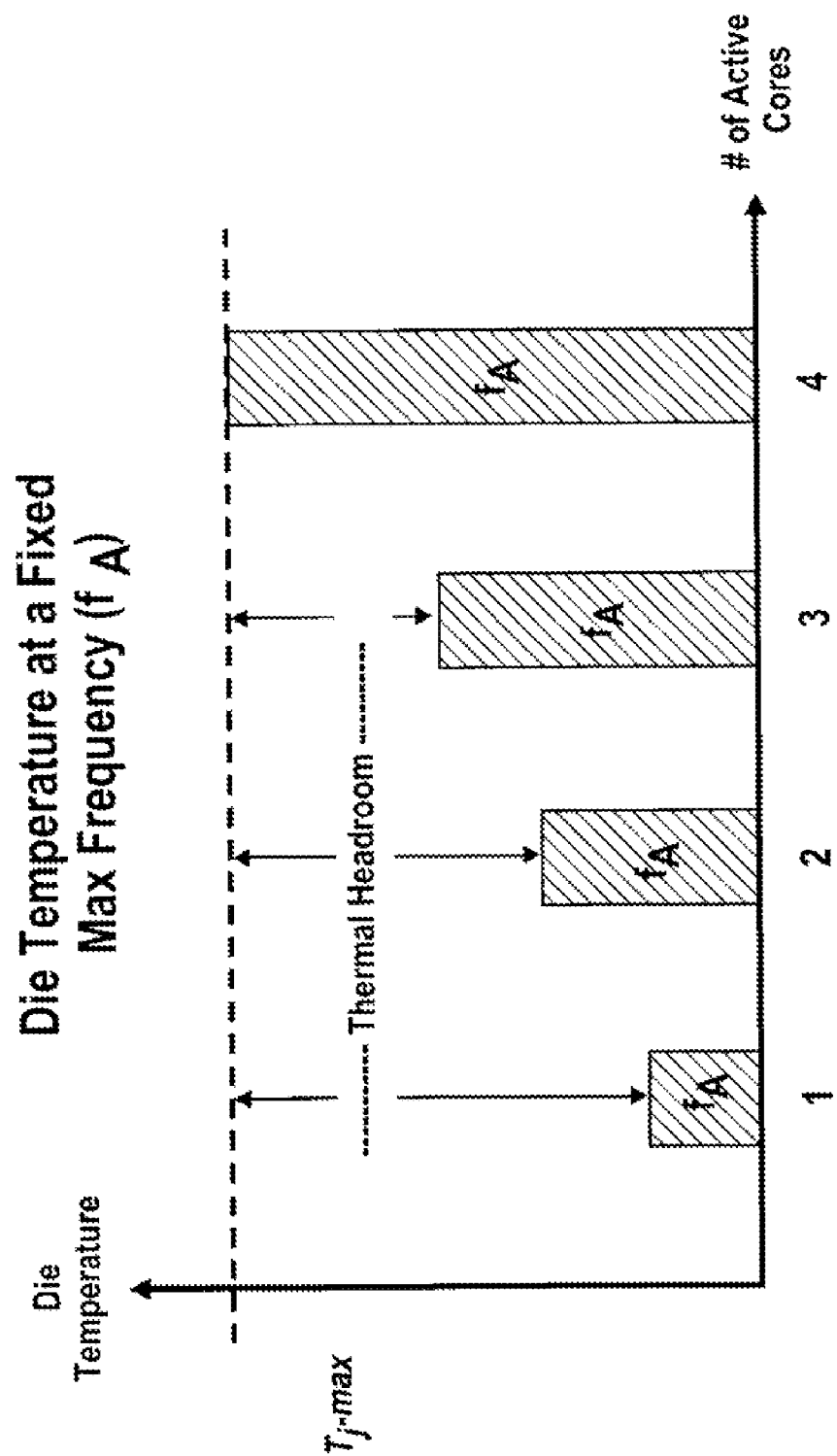
FIG. 1 is a graph according to some embodiments.

FIG. 1 is a graph according to some embodiments. The graph has a dashed horizontal line that depicts the maximum die temperature allowed, a y axis depicting a die temperature, and an x axis depicting a number of cores that have an active status. In this particular embodiment, the processor cores at operating at a fixed maximum frequency, fa. An active status indicates the core is processing an operation, hence, it is not idle. Typically, as the number of active cores on a processor increases, so does the range of power consumed.

The graph depicts the amount of thermal headroom decreases as the number of active cores increases. Conversely, the amount of thermal headroom increases as the number of active cores decreases. For the example of one, two, and three active cores, there is allowable thermal headroom that is not utilized.

Figure 2:
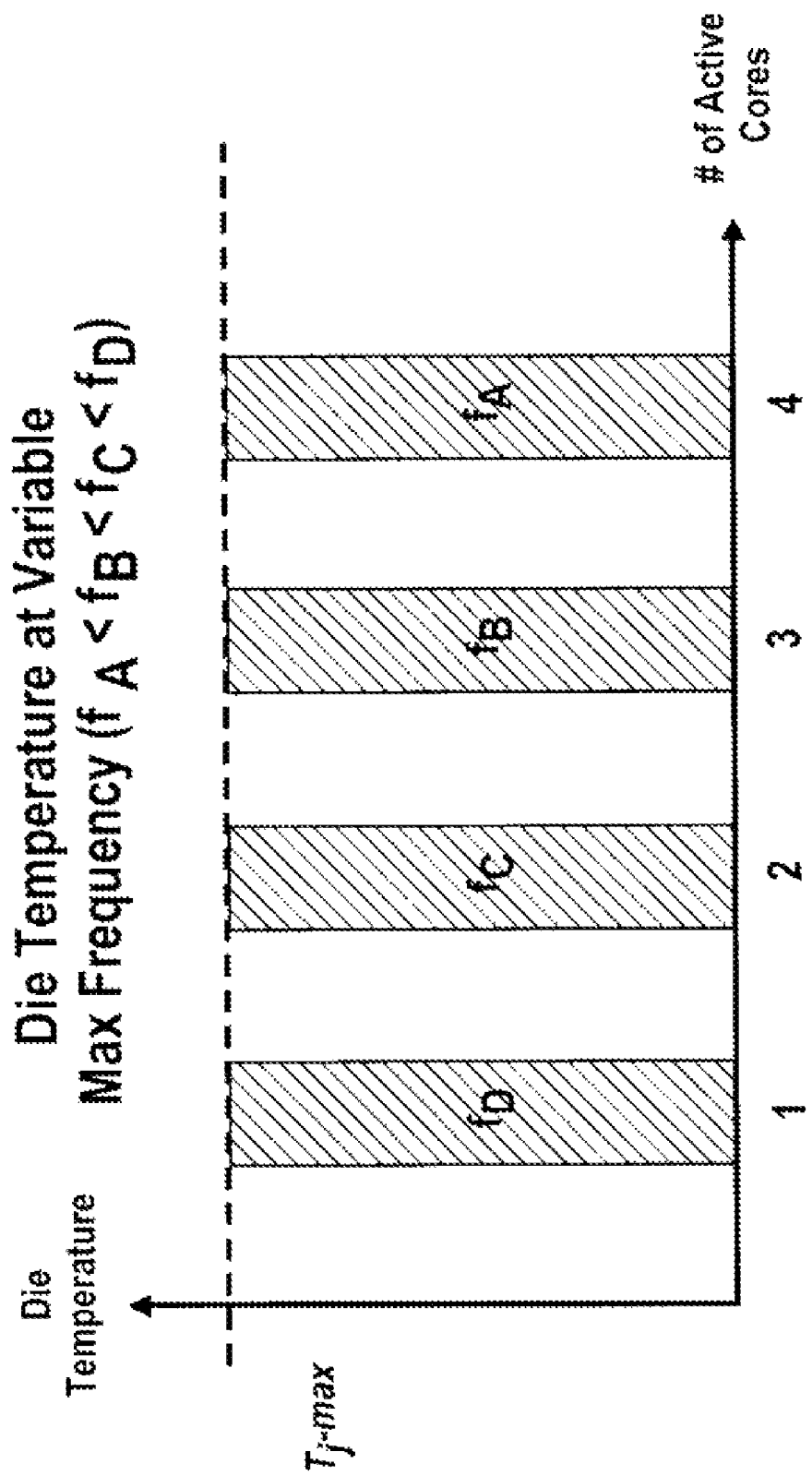
FIG. 2 is a graph according to some embodiments.

FIG. 2 is a graph according to some embodiments. The graph has a dashed horizontal line that depicts the maximum die temperature allowed, a y axis depicting a die temperature, and an x axis depicting a number of cores that have an active status. In this particular embodiment, the processor cores at operating at different frequencies based at least in part on the number of active cores such that fa<fb<fc<fd. For example, the frequency is decreased as the number of active cores is increased. Obviously, this allows increased performance since this graph differs from FIG. 1 because of the lack of thermal headroom.

An active status indicates the core is processing an operation, hence, it is not idle. Typically, as the number of active cores on a processor increases, so does the range of power consumed.

The graph depicts the amount of thermal headroom decreases as the number of active cores increases. Conversely, the amount of thermal headroom increases as the number of active cores decreases.

As previously discussed, with the progress toward multi-die processors, each die can not readily ascertain the status of the other dies with respect to an idle or active status. Consequently, this precludes setting an optimal frequency and performance for the multi-die processor. One inefficient solution is routing dedicated signal lines to transmit and receive core power status. Unfortunately, the cost of this solution is directly proportional to the number of cores as well as the number of core power states.

Embodiments of the present invention concern the use of a dedicated interface to transmit core status among multiple cores in a multi-die microprocessor. Several following embodiments discuss a multi-core processor with a dedicated interface to transmit core status among multiple cores in a multi-die microprocessor.

Figure 3:
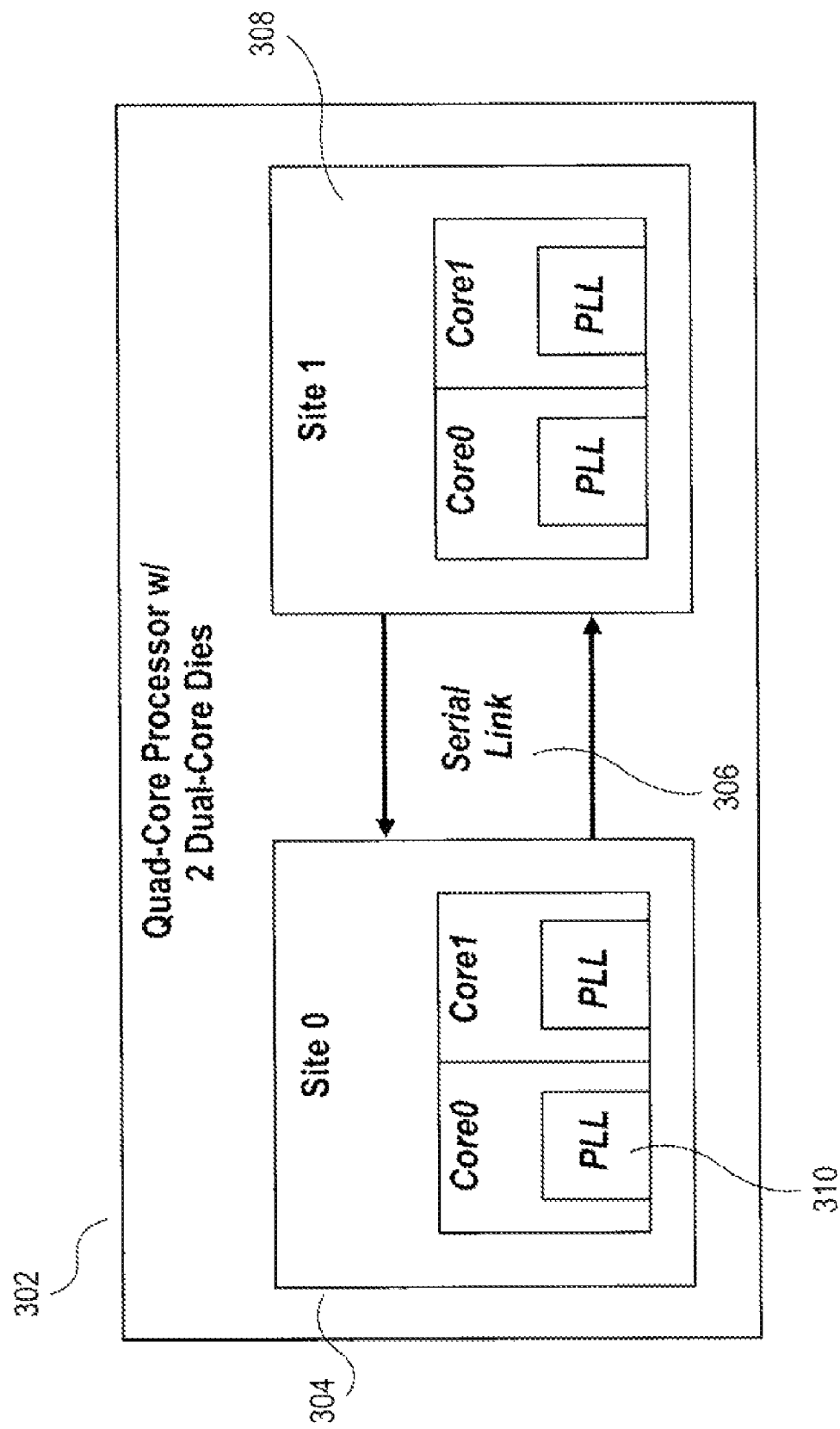
FIG. 3 is an illustration of an apparatus according to some embodiments.

FIG. 3 is an illustration of an apparatus according to some embodiments. In this embodiment, a quad core processor 102 with two dual-core dies 104 and 108 is portrayed. A dedicated serial link interface 106 allows the twp dual core dies, or sites, 104 and 108 to communicate their respective core power status to facilitate a setting of an optimal frequency between the two dual-core dies. Furthermore, in one embodiment, the cores on each site are identical and have their own clock generators, PLLs (Phase Locked Loops). In this embodiment, it allows multi-core processors to optimize their maximum frequency even when the cores are on separate dies.

Figure 4:
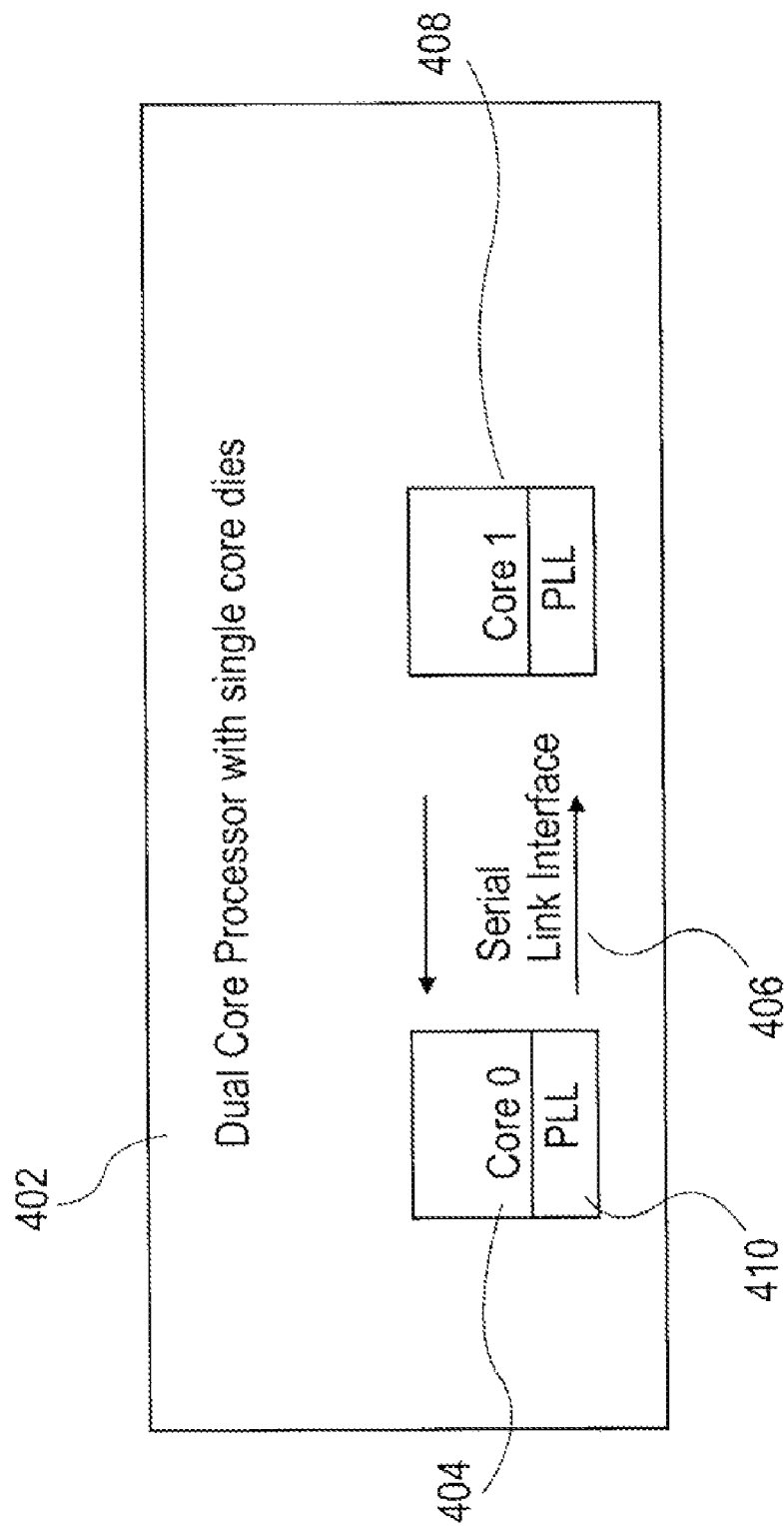
FIG. 4 is an illustration of an apparatus according to some embodiments.

FIG. 4 is an illustration of an apparatus according to some embodiments. In this embodiment, a dual core processor 402 with single core dies 404 and 408 is portrayed. A dedicated serial link interface 406 allows the dies to communicate their respective core power status to facilitate a setting of an optimal frequency between the two dies. Furthermore, in one embodiment, the cores on each site are identical and have their own clock generators, PLLs (Phase Locked Loops). In this embodiment, it allows multi-core processors to optimize their maximum frequency even when the cores are on separate dies.

Figure 5:
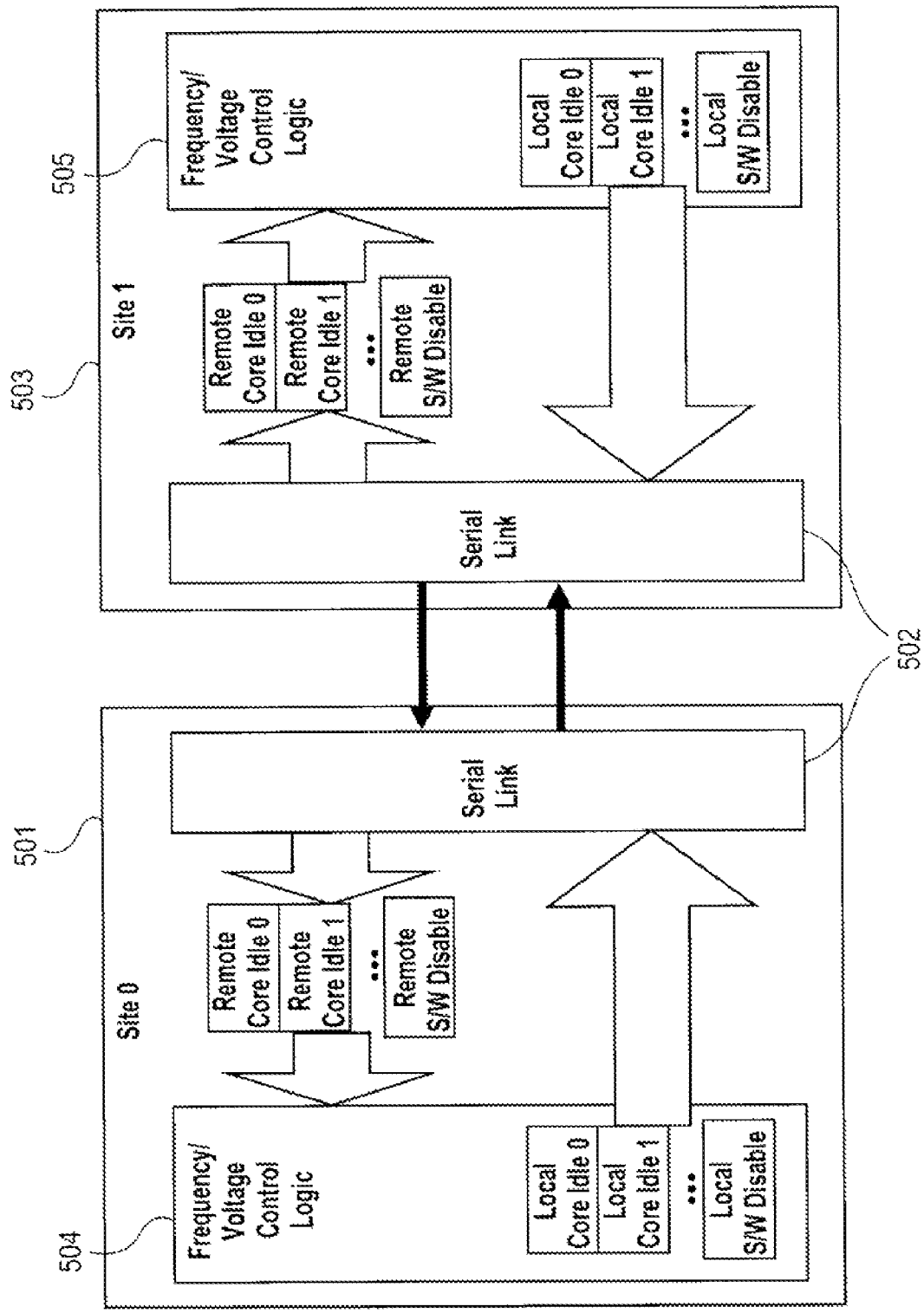
FIG. 5 is an illustration of an apparatus according to some embodiments.

FIG. 5 is an illustration of an apparatus according to some embodiments. In this embodiment, sites 501 and 503 communicate via an interface 502. In one embodiment, the interface 502 is a serial interface. In another embodiment, the serial interface is a two wire interface, one wire for transmitting and one wire for receiving. In this embodiment, the serial interface converts a data packet containing local core power status and a turbo software mode status into a serial stream and transmits from one site to another site. The receiving site's frequency/voltage logic (504 or 505) then determines an operating frequency for both sites based at least in part on the local and remote core power status and the turbo software mode status. In one embodiment, the frequency/voltage logic utilizes an algorithm as depicted in connection with FIG. 7.

In one embodiment, the frequency voltage logic resides in each site of the multi-site processor. In another embodiment, the frequency voltage logic resides in a chipset. In yet another embodiment, the frequency voltage logic resides in a power controller chip.

Figure 6:
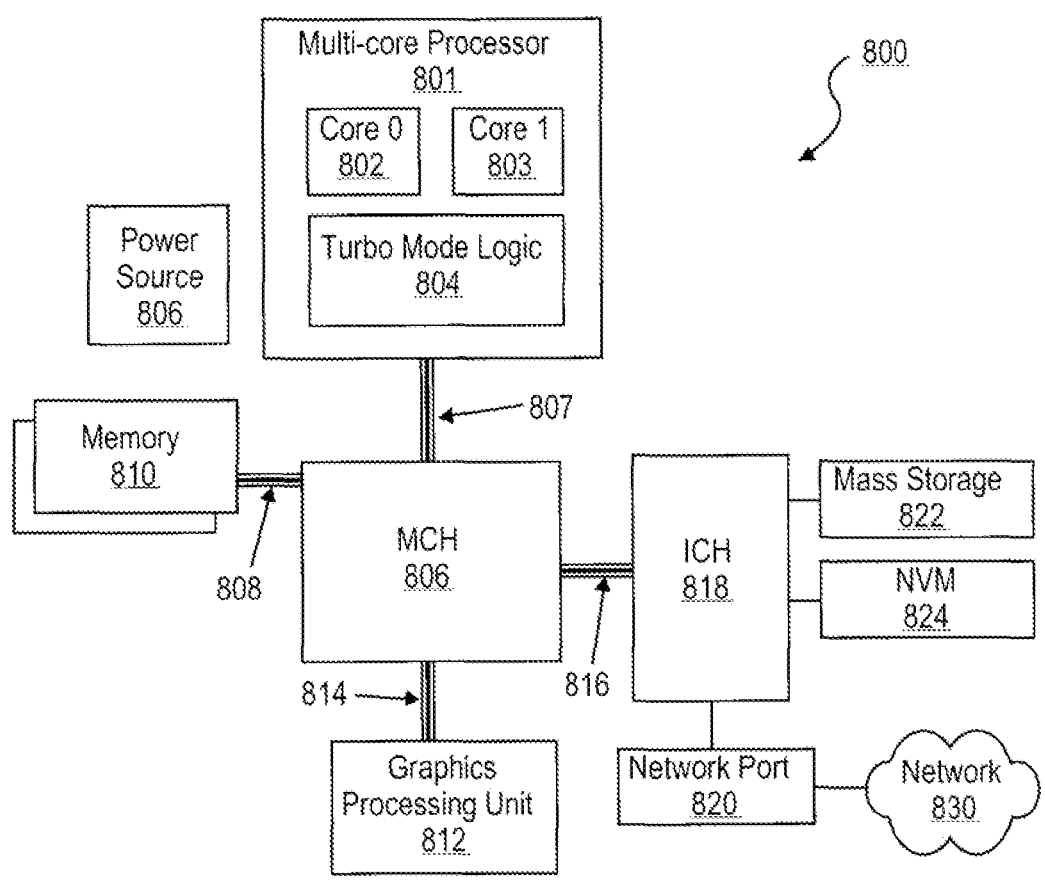
FIG. 6 is an illustration of a system according to some embodiments.

FIG. 6 illustrates a system block diagram according to some embodiments. The system (800) includes at least a multi-core processor or CPU (801), memory controller device (806), I/O controller device (818), and one or more memory devices (810). Note that in some embodiments, the memory controller device and/or the I/O controller device may be integrated into the CPU/processor (801).

The multi-core processor (801) includes at least two cores, Core 0 (802) and Core 1 (803). In some embodiments, the processor (801) may include additional cores. In embodiments including more than two cores, only one core may be allowed to operate in turbo mode while at least one core is idle, or, multiple cores may be allowed to operate in turbo mode while multiple cores remain idle.

The processor (801) also includes turbo mode logic (804), as described above in conjunction with the cross referenced application, to allow at least one core of the processor to operate at a higher than guaranteed frequency while at least one core of the processor is idle. Thus, available power and thermal headroom may be used by one core to increase or maximize the overall performance of the system when another core is idle.

The system may also include a network port or interface (820), and may be capable of being coupled to a wired or wireless network (830). The memory controller device (806) is coupled to the CPU (801) by a bus (807). The memory controller device (806) provides the CPU (801) with access to one or more memory devices (810), to which the memory controller device (806) is coupled by a memory bus (808).

A graphics processing unit (812) may be coupled to the memory controller device via a bus (814). An I/O controller device (818) may be coupled to the memory controller device (806) by a bus (816). The I/O controller device (818) may be coupled to a network port (820), capable of connecting to a network (830). The I/O controller device (818) may also be coupled to a mass storage device (822) and/or non-volatile memory (824). A battery or other power supply (806) may provide power to the system.

Together, these components form a system (800) that is capable of supporting the execution of machine readable instructions by CPU (801), and the storage of data, including instructions, within memory devices (810).

Figure 7:
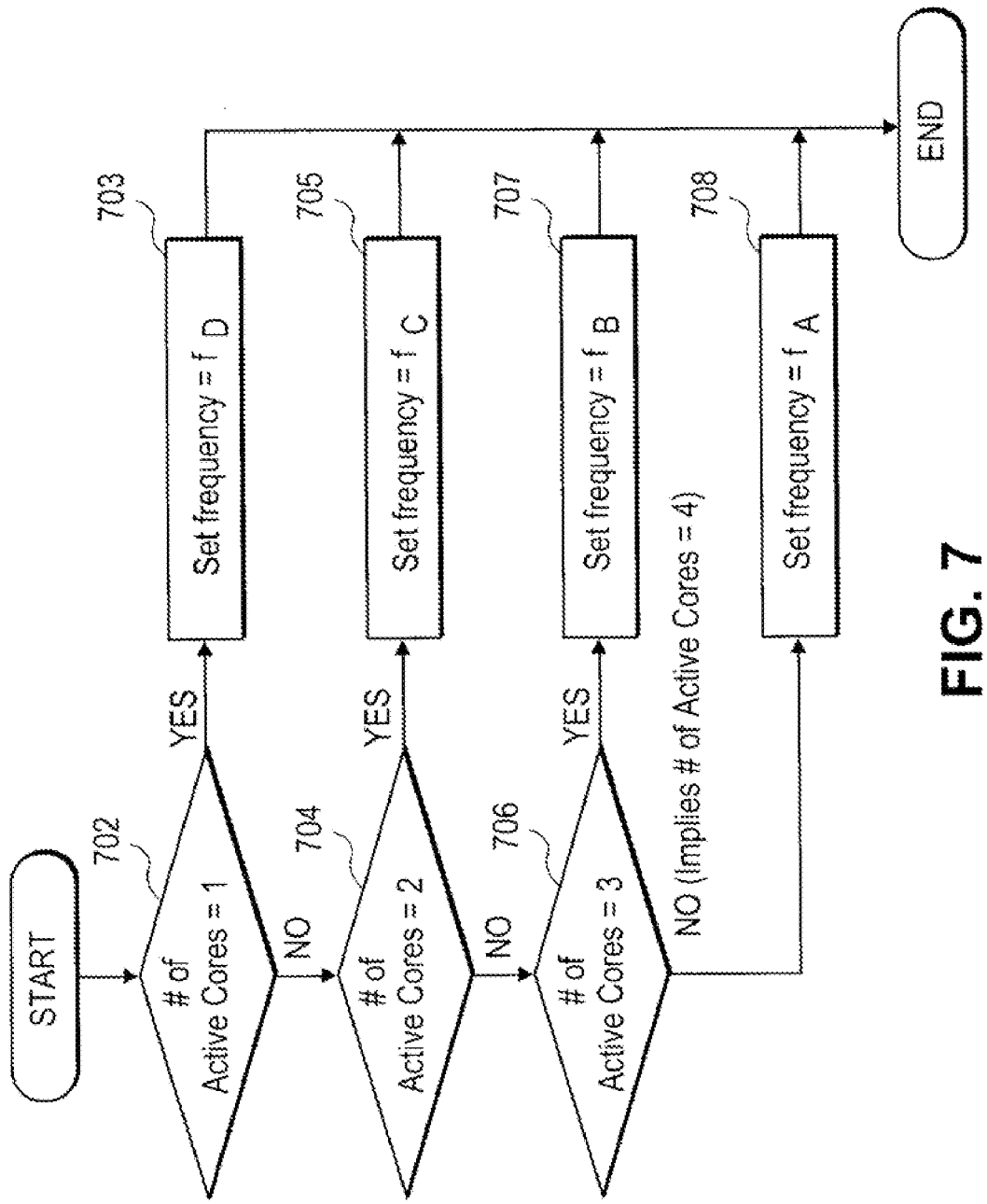
FIG. 7 is a method for a flowchart according to some embodiments.

FIG. 7 is a method for a flowchart according to some embodiments. In this embodiment, the method depicts a frequency selection for a two site processor, each site with two cores. However, the claimed subject matter is not limited to this embodiment. As depicted in FIG. 4, each site may have only one core. Furthermore, each site may utilize any number of cores depending on the application or other factors.

In this embodiment, the amount of active cores is determined by the local core power status and the remote core power status received via the interface. In the first decision block, 702, the frequency selected for all the cores is fd (block 703) if the number of active cores is one. Otherwise, the second decision block, 704 is analyzed. The frequency selected for all the cores is fc (block 705) if the number of active cores is two. Otherwise, the decision block, 706, is analyzed. The frequency selected for all the cores is fb (block 707) if the number of active cores is three. Otherwise, the frequency selected for all the cores is fa (block 708) if the number of active cores is four. In this embodiment, frequency fd is higher than fc, frequency fc is higher than fb, and frequency fb is higher than fa.

Thus, a method, apparatus, and system for optimizing frequency and performance in a multi-die Microprocessor are disclosed. In the above description, numerous specific details are set forth. However, it is understood that embodiments may be practiced without these specific details. In other instances, well-known circuits, structures, and techniques have not been shown in detail in order not to obscure the understanding of this description. Embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A processor comprising:
a plurality of cores, a turbo mode logic that resides in the processor to enable improved performance of the processor, at least in part, by increase of an operating frequency of at least one of the plurality of cores during a period in which at least one other of the plurality of cores is idle, wherein the at least one other of the plurality of cores is to communicate a core power status to the turbo mode logic via a serial interface.

2. The processor of claim 1, wherein the operating frequency is higher than a guaranteed frequency while the at least one other of the plurality of cores is idle.

3. The processor of claim 1, wherein the at least one of the plurality of cores is to use an available power of the at least one other of the plurality of cores to increase the operating frequency of the at least one of the plurality of cores.

4. The processor of claim 1 further comprising a plurality of phase locked loops (PLLs) coupled to the plurality of cores, wherein the one of the plurality of phase locked loops coupled to the at least one of the plurality of cores is to increase the operating frequency of the at least one of the plurality of cores.

5. The processor of claim 1, wherein each of the plurality of cores is distributed among a plurality of dies.

6. The processor of claim 5, wherein the plurality of cores are to send and receive their power status on one or more interfaces.

7. The processor of claim 6, wherein the one or more interfaces include the serial interface.

8. The processor of claim 7, wherein the serial interface is a two wire interface.

9. The processor of claim 7, wherein the serial interface comprises a dedicated serial link interface.

10. The processor of claim 1, wherein the turbo mode logic is included in one of the plurality of cores.

11. The processor of claim 1, wherein the processor comprises a quad core processor.

12. A system comprising:
a multi-core processor comprising:
  a plurality of cores;
  a turbo mode logic to increase an operating frequency of at least one of the plurality of cores during a period in which at least one other of the plurality of cores is idle, wherein the at least one other of the plurality of cores is to communicate a core power status to the turbo mode logic via a serial interface;
  a memory controller coupled to the plurality of cores; and
  an input/output controller coupled to the plurality of cores; and
a memory coupled to the multi-core processor.

13. The system of claim 12, wherein the operating frequency is higher than a guaranteed frequency while the at least one other of the plurality of cores is idle.

14. The system of claim 12, wherein the at least one of the plurality of cores is to use an available power of the at least one other of the plurality of cores to increase the operating frequency of the at least one of the plurality of cores.

15. The system of claim 12, further comprising a plurality of phase locked loops (PLLs) coupled to the plurality of cores, wherein the one of the plurality of phase locked loops coupled to the at least one of the plurality of cores is to increase the operating frequency of the at least one of the plurality of cores.

16. A processor comprising:
a first core;
a second core;
a third core;
a fourth core;
a serial link interface to communicate a power status and a turbo software mode status of the first, second, third and fourth cores, wherein the serial link interface is a two wire interface having a first wire to transmit and a second wire to receive a serial stream of data of the power status and the turbo software mode status converted from a data packet into the serial stream; and
a frequency selection logic to determine an operating frequency of the first core based at least in part on the power status and the turbo software mode status of the first, second, third and fourth cores, wherein a variable frequency is selected for the first core based on a number of active cores.

17. The processor of claim 16, wherein the frequency selection logic is to select a first frequency for the first core if a number of active cores is one, a second frequency for the first and second cores if the number of active cores is two, a third frequency for the first, second and third cores if the number of active cores is three, and a fourth frequency for all the cores if all the cores are active.

18. The processor of claim 16, wherein the operating frequency is higher than a guaranteed frequency while at least one other of the second, third and fourth cores is idle.

19. The processor of claim 18, wherein the first core is to use an available power of at least one of the second, third and fourth cores to increase the operating frequency.

20. The processor of claim 16, wherein the frequency selection logic is of the first core.

* * * * *